No. 894,312.
PATENTED JULY 28, 1908.
M. BROWN.
DRINKING TROUGH.
APPLICATION FILED AUG. 8, 1907.
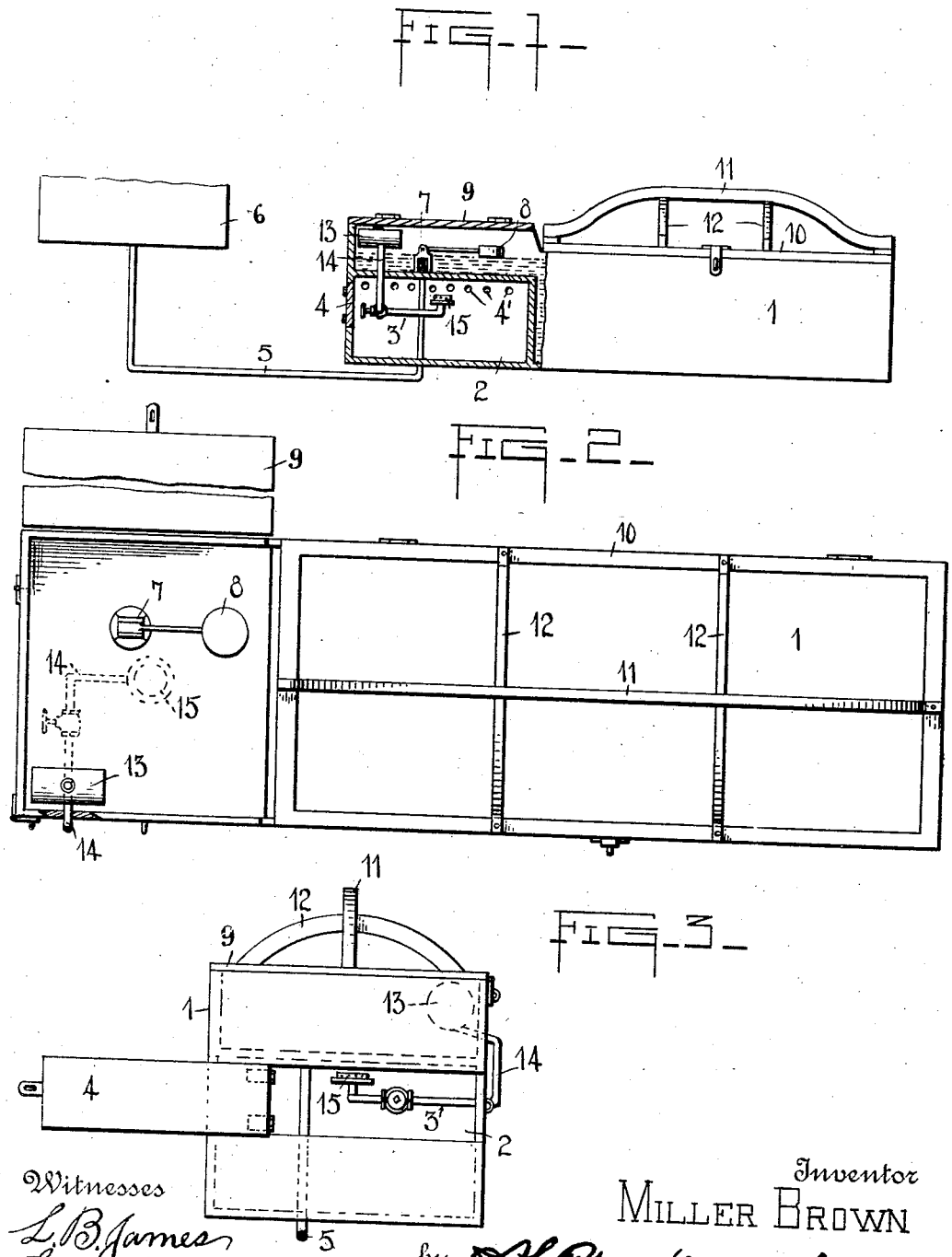
Witnesses
L. B. James
L. O. Hilton
Inventor
MILLER BROWN
by H. B. Willson & Co.
Attorneys

UNITED STATES PATENT OFFICE.

MILLER BROWN, OF RICHMOND, MISSOURI.

DRINKING-TROUGH.

No. 894,312.　　　Specification of Letters Patent.　　　Patented July 28, 1908.

Application filed August 8, 1907. Serial No. 387,676.

*To all whom it may concern:*

Be it known that I, MILLER BROWN, a citizen of the United States, residing at Richmond, in the county of Ray and State of Missouri, have invented certain new and useful Improvements in Drinking-Troughs; and I do declare the following to be a full, clear, and exact description of the invention, such as will enable others skilled in the art to which it appertains to make and use the same.

This invention relates to an improved drinking trough and water heater especially designed for the use of hogs.

The object of the invention is to provide a water trough for hogs, sheep and other stock, which is always filled with water of a suitable temperature to be acceptable to the stock, even in the coldest weather, and one at which a number of hogs or other animals may drink without being able to get into the trough.

In the accompanying drawings,—Figure 1 represents a side elevation of this improved trough with parts broken out to show the interior of one end thereof; Fig. 2 represents a top plan view with the cover at the end thereof in open position; Fig. 3 represents an end elevation with the door open.

In the embodiment illustrated a trough 1 of any suitable or desired shape is shown having a compartment 2 formed at one end thereof to receive a heater 3 of any desired form. This compartment 2 preferably extends about two-thirds of the height of the trough, and has a door 4, preferably at the end thereof to permit access to the heater for cleaning, regulating and other purposes. This heater-containing compartment is also provided with air holes 4'. A water supply pipe 5 extends from a tank 6 or other suitable source and is shown as running through the compartment 2 and having a valve 7 arranged at its upper end controlled by a float 8. A door 9 shuts over this end of the trough and protects the valve. A hinged cover 10 is arranged over the top of the trough and preferably comprises a rectangular frame having an arched strip 11 extending longitudinally of said frame over the trough, and transversely arranged strips as 12 provide a plurality of spaces for the various animals, one of which only may drink through each opening.

This trough may be made of any desired size, and is preferably composed of rust-proof or galvanized iron about twelve inches wide and eight to ten inches deep. A gasolene heater is shown with the tank 13 arranged in the trough above the heater compartment and protected by the cover 9, and a pipe 14 extends therefrom into the compartment 2 and is provided with a burner 15. This trough is preferably set in the ground for about four or five inches to prevent upsetting thereof and to assist in keeping the water from freezing in very cold weather.

In the use of this invention the trough is kept always full of water, and the float valve thereof prevents overflow, and it may be easily cleaned by opening the top 10.

I claim as my invention:

1. A drinking trough having a compartment at one end terminating below the top thereof and provided with perforations in its sides opening to the atmosphere, a heater disposed in said compartment, a water supply pipe opening into said trough above said compartment and having a float actuated valve connected therewith, and a protective covering fitted on the end in which said compartment and float are disposed to protect them from the stock, the water above said compartment being in free circulation with the water in the uncovered portion of the trough.

2. A drinking trough having an upright partition extending across one end and terminating below the top thereof, a plate extending laterally from the top of said partition to one end of the trough forming a heating compartment at said end of the trough, said partition and plate being composed of heat conducting material, the sides of said compartment having openings arranged below said plate to permit air to pass into the heating compartment, a door in one of the exterior walls of said compartment to afford access thereto, a heater disposed in said compartment, a water supply pipe extending under said trough and up through said heating compartment into said trough above said plate and having a float actuated valve closing the end thereof and a cover arranged over the end of the trough in which said compartment and float are located.

In testimony whereof I have hereunto set my hand in presence of two subscribing witnesses.

MILLER BROWN.

Witnesses:
 BENJAMIN W. DUNN,
 RALPH E. BROWN.